United States Patent
Platt

(10) Patent No.: US 8,827,148 B2
(45) Date of Patent: Sep. 9, 2014

(54) APPAREL SHOPPING METHOD

(71) Applicant: International Business Machines Corporation, Armonk, NY (US)

(72) Inventor: Victoria B. Platt, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/742,617

(22) Filed: Jan. 16, 2013

(65) Prior Publication Data

US 2014/0197231 A1   Jul. 17, 2014

(51) Int. Cl.
*G06F 17/00* (2006.01)

(52) U.S. Cl.
USPC ........ 235/375; 235/385; 235/488; 705/14.53; 705/26.1

(58) Field of Classification Search
USPC ............... 235/375, 385, 488; 705/14.53, 26.1
See application file for complete search history.

(56) References Cited

U.S. PATENT DOCUMENTS

| | | | |
|---|---|---|---|
| 6,313,745 B1 | 11/2001 | Suzuki | |
| 2002/0143655 A1 | 10/2002 | Elston et al. | |
| 2005/0270158 A1* | 12/2005 | Corbett, Jr. | 340/572.1 |
| 2006/0074745 A1* | 4/2006 | Shiomi | 705/14 |
| 2006/0256959 A1* | 11/2006 | Hymes | 379/433.04 |
| 2007/0096909 A1* | 5/2007 | Lally | 340/572.1 |
| 2008/0067244 A1* | 3/2008 | Marks | 235/385 |
| 2009/0045617 A1 | 2/2009 | Lawandy et al. | |
| 2010/0030661 A1* | 2/2010 | Friedland et al. | 705/27 |
| 2011/0135854 A1* | 6/2011 | Terashima | 428/29 |
| 2012/0095819 A1 | 4/2012 | Li | |
| 2012/0310727 A1* | 12/2012 | Bradley et al. | 705/14.41 |
| 2013/0065679 A1* | 3/2013 | Gelman et al. | 463/29 |
| 2013/0154441 A1* | 6/2013 | Redmond | 310/319 |

FOREIGN PATENT DOCUMENTS

| | | |
|---|---|---|
| WO | 2004072921 A1 | 8/2004 |
| WO | 2010129246 A2 | 11/2010 |
| WO | 2010141656 A1 | 12/2010 |

OTHER PUBLICATIONS

Kubler, S. et al., "Prototyping of a Communicating Textile", In International Conference on Industrial Engineering and Systems Management, May 25-May 27, 2011, 10 pages.

NIR and Visible Absorbing Dyes for Solventborne Coatings, url: http://epolin.com/default.aspx/MenuItemID/114/MenuSubID/19.htm, retrieved Nov. 14, 2012, 1 page.

IR Reflective Pigment Compositions, url: http://osdir.com/patents/Compositions-coating/IR-reflective-pigment-compositions-06989056.html, Jan. 24, 2006, retrieved Nov. 14, 2012, 8 pages.

* cited by examiner

*Primary Examiner* — Allyson Trail
(74) *Attorney, Agent, or Firm* — Isaac J. Gooshaw; John Pivnichny

(57) ABSTRACT

A marketing method for apparel shopping that provides a potential customer via a wireless device, the ability to choose a desired piece of clothing for purchase. The piece of clothing is embedded with a unique infrared thread. The thread, when read by a wireless device, provides a unique brand like SKU. This information is compared with data in a cloud databases. This provides data containing images, specifications, pricing, and retail distribution areas to the potential customer.

16 Claims, 4 Drawing Sheets

APPAREL SHOPPING METHOD

BACKGROUND OF THE INVENTION

1. Field of the Invention

The invention relates to marketing of apparel. More specifically, the invention relates to a method of marketing apparel to a customer based on an observation of another individual wearing a particular item in a public place.

2. Description of the Related Art

Attachment of RFID tags to articles of clothing for tracking merchandise through manufacture, supply chain, and retail store is well known. For example, Suzuki in U.S. Pat. No. 6,313,745 describes a system for tracking and reorganizing merchandise taken into fitting rooms.

Others have developed various systems for assisting a shopper in a retail store to locate or select merchandise in the retail store. Other systems also assist in completing various POS (point of sale) functions, such as check out, recording, discounts, payment processing, and the like.

Known systems may also accept a request for an item over a remote network and in response determine a preferred retail store or on-line supplier for that item based on considerations such as price, availability, or geographic proximity to the requester.

BRIEF SUMMARY OF THE INVENTION

A person in a public setting observes an article of apparel worn by an unrelated individual in the public setting. The person wishes to purchase an identical article, although perhaps of a different size, for their own use or for someone they know.

Without alerting the unrelated individual, and unbeknownst, the person aims a handheld infrared device at the article while being worn, receiving via reflected infrared signals, identifying information from which the SKU (stock keeping unit) of the article is determined. The handheld device uses the SKU to receive and display data about the article, such as nearest store having the article, price, images, and specifications.

DETAILED DESCRIPTION OF THE INVENTION

For a better understanding of the present invention, together with other and further objects, advantages, and capabilities thereof, reference is made to the following disclosure and the appended claims in connection with the above-described drawings.

Figure 1:
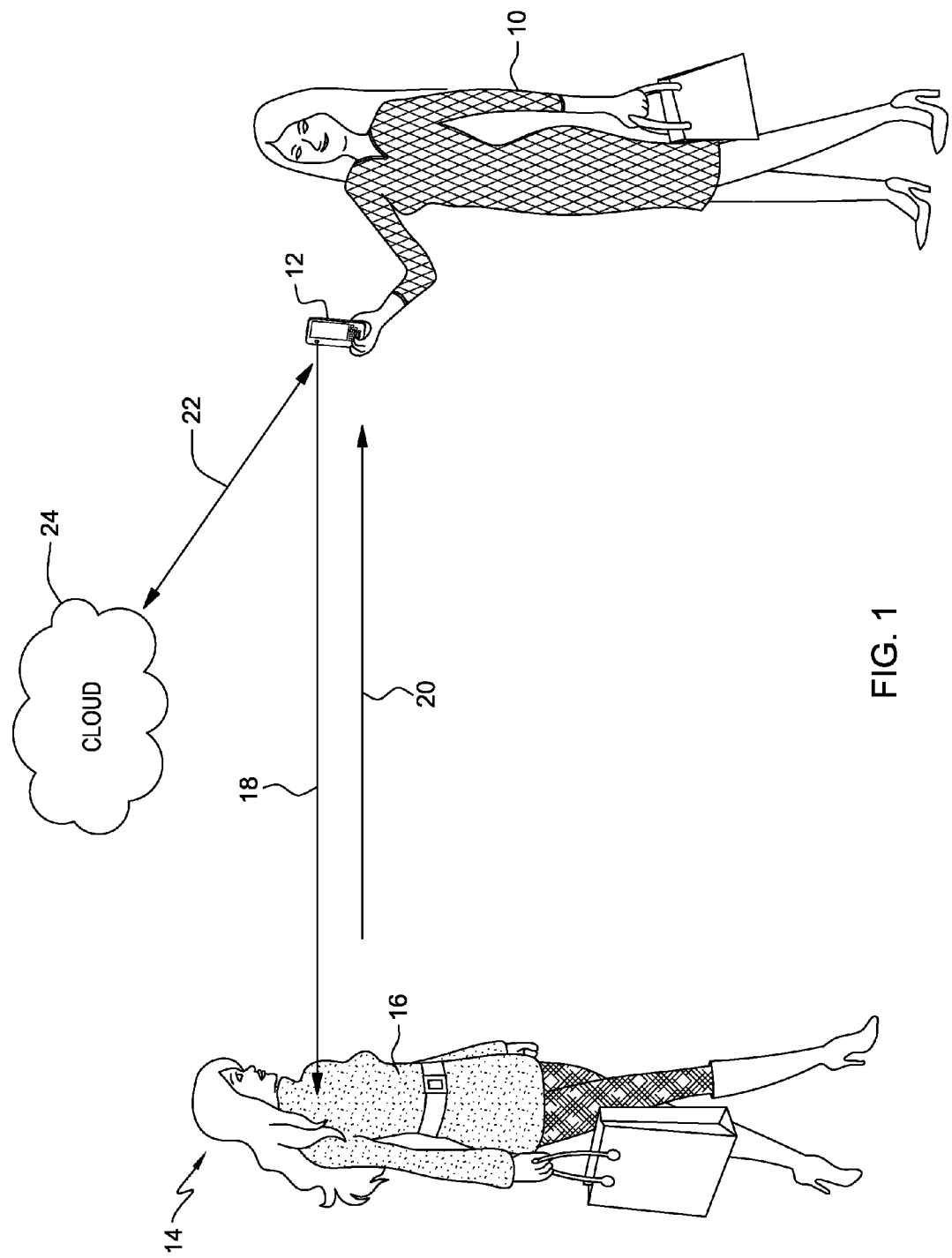
FIG. 1 is a diagram showing the present invention in operation.

In FIG. 1, there is shown individual 10, located in a public place other than a retail store, such as a coffee shop, parking lot, shopping district in a city, restaurant, or ski slope. Holding handheld wireless enabled device 12, individual 10 directs the device towards another individual 14, also located nearby in the same public place. Individual 14 is wearing an article of clothing of interest to individual 10. Individual 10 may be any person, man, woman, or child capable of wearing an article of clothing. Individual 10 may also be a pet animal, such as a dog or cat, if such animal is wearing an article of clothing. Individual 14 is wearing article of clothing 16 which is embedded with an infrared coded thread 410 (see FIG. 4), which comprises a machine readable identifier. This identifier contains specific code that can be read by handheld device 12. From handheld device 12, an infrared beam 18 is sent to article of clothing 16 embedded with thread 410, and reads the identifier. The infrared energy from the thread is reflected back 20 to handheld device 12.

The value of the identifier is based on the particular wavelengths of infrared energy received by handheld device 12 as explained below in the description of FIG. 4. This value is compared with a listing of identifiers and corresponding SKU's (stock keeping units) stored in cloud based storage database 24.

By using the SKU, images, specifications, pricing and retail distribution areas may be retrieved from 22, cloud 24 and presented to individual 10, for example, using display screen 401 of handheld device 12.

As used herein, cloud shall be taken to mean computing resources delivered over a network having wireless connectivity to portable devices.

Individual 10 may subsequently choose to purchase the article at a nearby retail store using the information presented.

Figure 2:
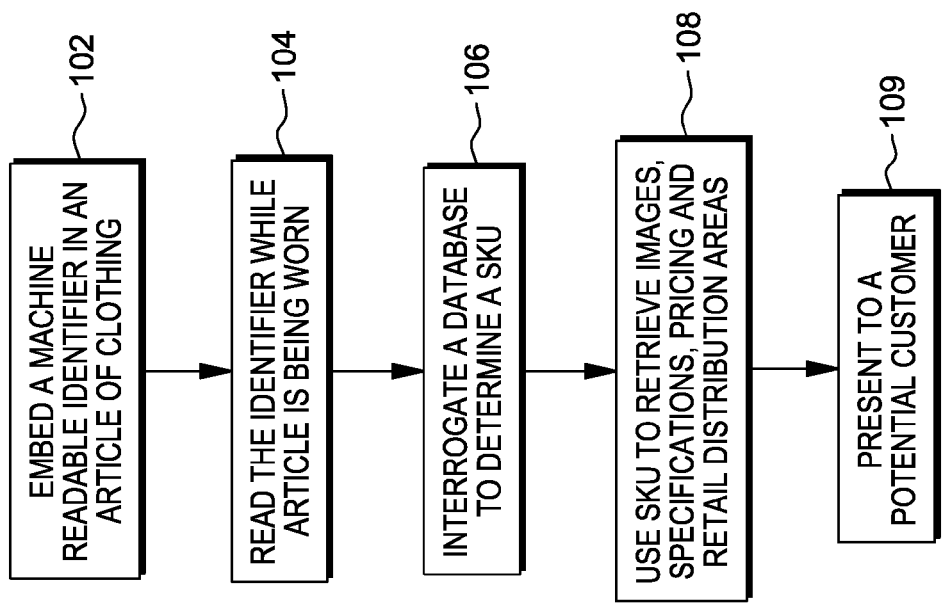
FIG. 2 is a flowchart illustrating the basic operational steps of an embodiment of the present invention.

In FIG. 2, there is shown a flowchart depicting steps performed in practicing one embodiment of the invention. In step 102, a machine readable identifier is embedded in article of clothing 16. The identifier preferably comprises a thread 410 coated with infrared reflecting or absorbing dye. The thread may be identical, except for the infrared dyes, to other threads used in weaving the fabric from which article 16 is made. Alternatively, thread 410 may be manually or machine added, such as by sewing, to article 16. Thread 410 is preferably added in such a manner as to be invisible to normal (optical) observation of article 16.

Figure 3:
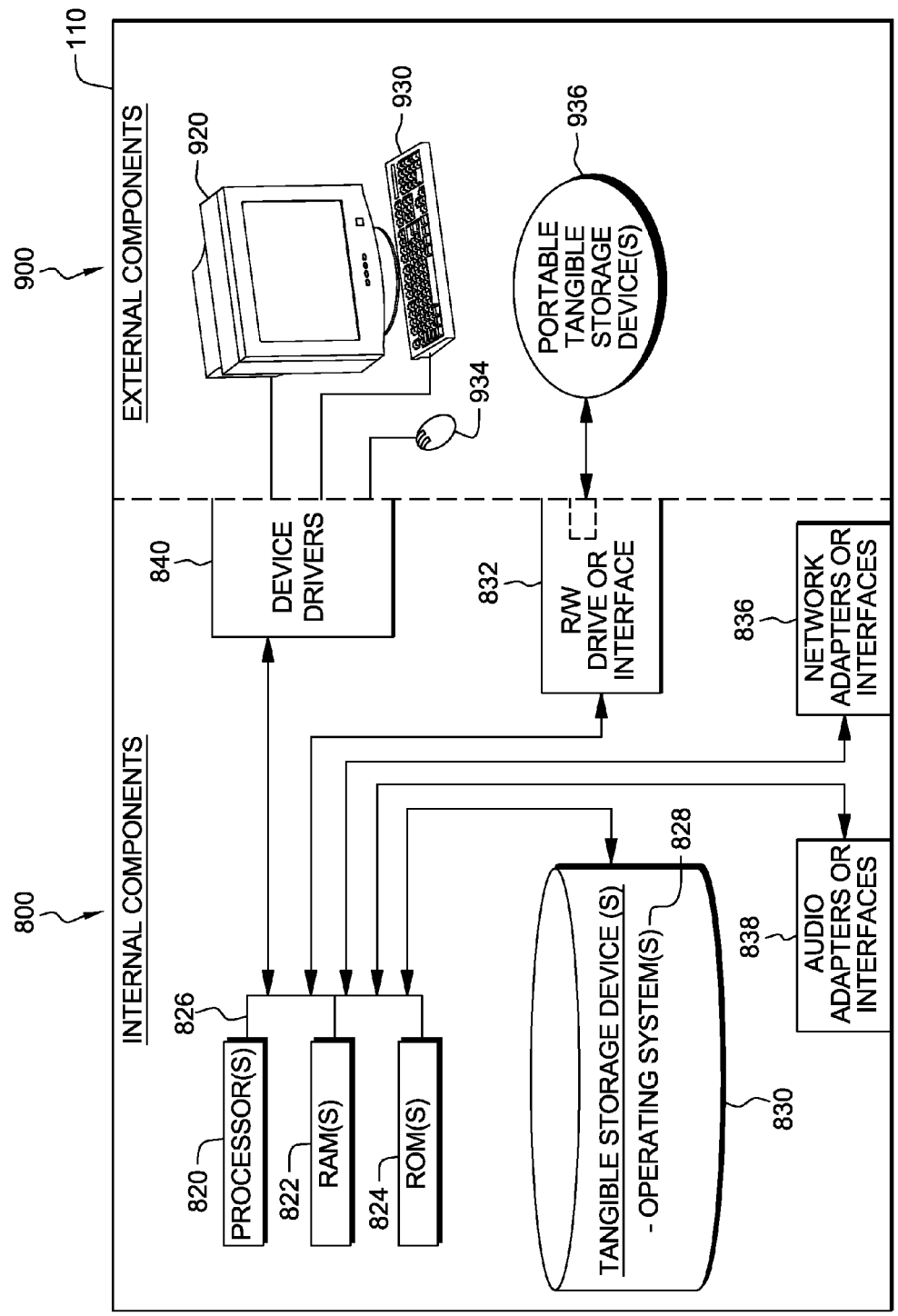
FIG. 3 is a system diagram of a computer hardware and software product for use in implementing portions of the present invention.

In step 104, identifier 410 is inconspicuously read by another individual using a handheld device 12 having infrared reading capability. Identifier 410 is read while article 16 is being worn by another individual who is unaware the identifier is being read. Handheld device 12 may include a processor as shown in FIG. 3 having instructions stored therein for performing the steps of FIG. 2, including instructions for reading identifier 410 by infrared means located within device 12.

In step 106, handheld device 12 is in communication 22 with a database in cloud network 24. The database is interrogated to determine an SKU from the read value of identifier 410. Individual 10 may manually initiate the interrogation step 106, or preferably device 12 automatically performs step 106 immediately after reading the identifier in step 104.

In step 108, the SKU is used to retrieve images, or specifications, or pricing, or retail distribution areas or other information stored in cloud 24. Such retrieval may use any wireless communication technique known in the art, such as wi-fi, bluetooth, or the like.

In step 109, some or all of the information retrieved in step 108 is presented on screen 104 to a potential customer, who is preferably individual 10, on handheld device 12. Such presentation may be automatic, or in response to keystrokes on keyboard 402, or other navigation entry techniques, such as finger touches on a touch sensitive screen.

FIG. 3 shows a block diagram of internal components 800 and external components 900 of a computer 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Computer 110 is representative of any electronic device capable of executing machine-readable program instructions. Computer 110 may be representative of a computer system or other electronic devices. Examples of computing systems, environments, and/or configurations that may be represented by computer 110 include, but are not limited to, personal computer systems, server computer systems, thin clients, thick clients, laptop devices, smart phones, multiprocessor systems, microprocessor-based systems, network PCs, minicomputer systems, and distributed cloud computing environments that include any of the above systems or devices.

Computer 110 includes a set of internal components 800 and external components 900. Internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, functions in computer device 110 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. Functions in computer 110 can be stored on one or more of the respective portable computer-readable tangible storage devices 936, read via the respective R/W drive or interface 832 and loaded into the respective hard drive 830.

Internal components 800 also includes audio adapters or interfaces 838 such as a sound card, hardware mixer, amplifier, or other adapters or interfaces for receiving audio signals from microphones.

Internal components 800 also includes network adapters or interfaces 836 such as a TCP/IP adapter cards, wireless wi-fi interface cards, or 3G or 4G wireless interface cards or other wired or wireless communication links. Functions in computer 110 can be downloaded to computer 110 from an external computer via a network (for example, the Internet, Cloud 24, a local area network or other, wide area network) and respective network adapters or interfaces 836. From the network adapters or interfaces 836. The network may comprise copper wires, optical fibers, wireless transmission, routers, firewalls, switches, gateway computers and/or edge servers.

External components 900 can include a computer display monitor 920, a keyboard 930, and a computer mouse 934. External components 900 can also include touch screens, virtual keyboards, touch pads, pointing devices, and other human interface devices. Internal components 800 includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

FIG. 3 may describe in more detail some of the computing resources comprising cloud 24.

Figure 4:
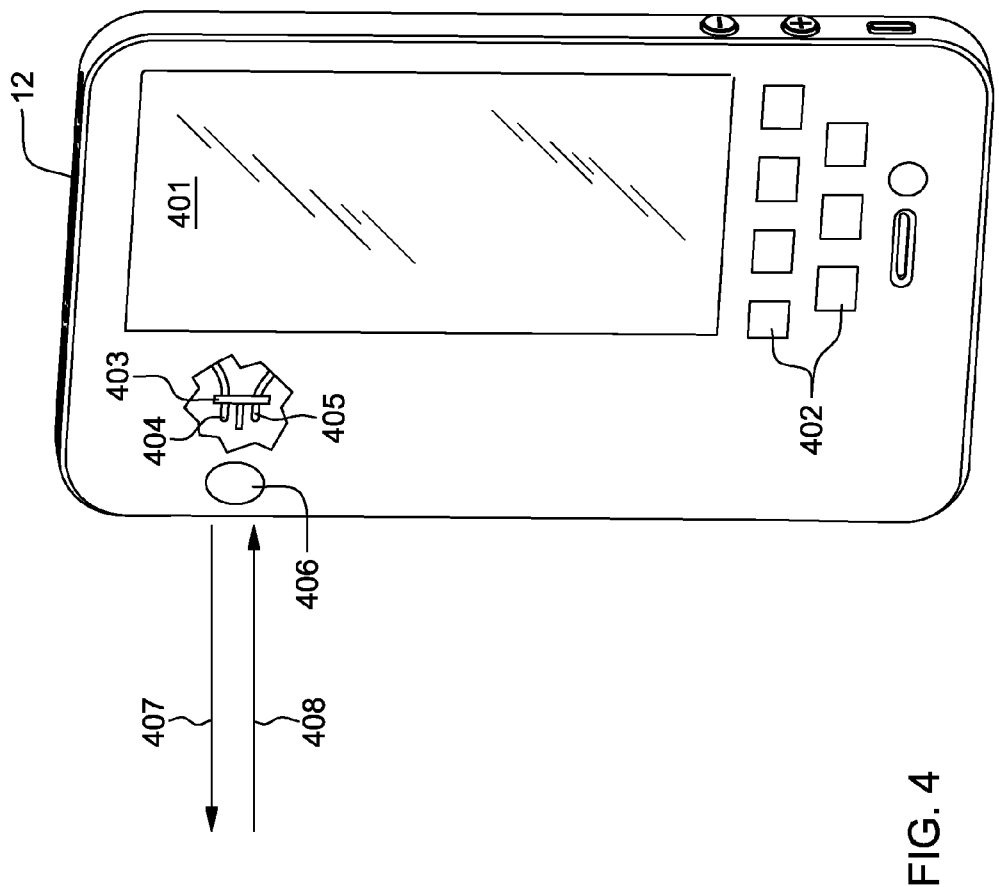
FIG. 4 is a detailed diagram illustrating operation of the infrared portion of a handheld device in accordance with the present invention.
Figure 4:
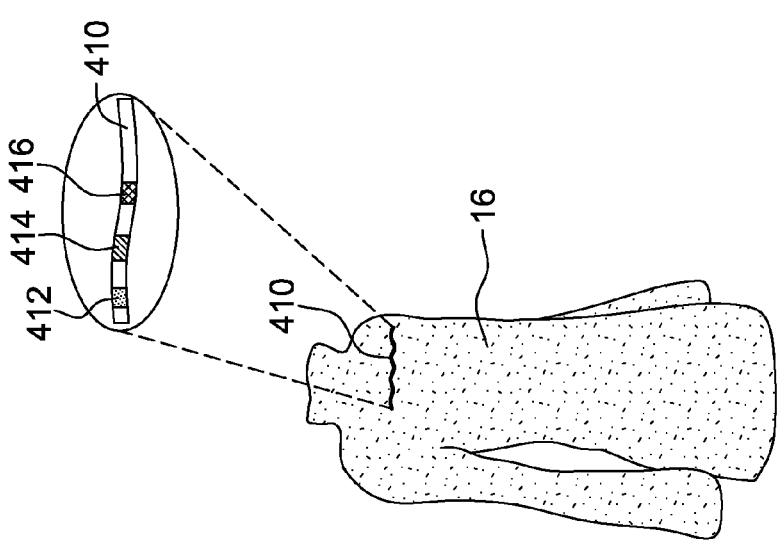

In FIG. 4, there is shown portable infrared reader 12 having an infrared device 403 positioned therein. Device 403 includes an infrared emitting component 404 which may be an infrared LED or any other component known in the art capable of emitting infrared energy. Device 403 also includes infrared sensing component 405 which may be a semiconductor component or any other part capable of sensing incoming infrared energy.

Device 403 is positioned behind lens 406 in such a way that the emitted infrared energy is directed outward in substantially a parallel beam 407. Likewise, incoming infrared energy 408 is directed by lens 406 substantially onto sensing component 405. Lens 406 may comprise separate lenses for components 404 and 405 or a plurality of lenses which are obvious modifications to one of ordinary skill, without departing from the present invention.

Emitting component 404 may comprise a plurality of emitting components. For example, one emitting component may emit infrared energy having a peak wavelength of 773 nanometers (nm) and a second emitting component may emit infrared energy having a peak wavelength of 860 nm.

Sensing device 403 may also comprise a plurality of sensing devices. For example, one sensing device may have a peak sensitivity to infrared energy having a wavelength of 773 nm and a second sensing device may have a peak sensitivity to infrared energy having a wave length of 860 nm.

Apparel item 16 has one or more threads 410 woven into the fabric from which it is made. Thread 410 is coated along its length with one or more bands, 412, 414, 416 of absorbing or reflecting dyes, each of which has a peak absorbance or reflectance at a particular wavelength of infrared energy. For example, the Epolin Company of Newark, N.J., manufactures a series of absorbing dyes having peak absorbance at the wavelengths indicated in Table 1 below.

TABLE 1

| Epolin Part No. | Peak Absorbance (nm) |
|---|---|
| 3036 | 773 |
| 5548 | 777 |
| 3211 | 785 |
| 5768 | 791 |
| 3442 | 817 |
| 5588 | 860 |
| 3443 | 868 |
| 2063 | 906 |
| 5547 | 907 |
| 2062 | 977 |
| 2066 | 978 |
| 2057 | 990 |
| 2180 | 991 |
| 2164 | 993 |
| 1151 | 1070 |
| 1117 | 1071 |
| 1178 | 1073 |
| 3045 | 1097 |

A thread may be coated with a sufficient number of bands 412, 414, 416 to provide a distinct identifier for the article. Where one thread does not provide sufficient length, additional threads may be used, each having various bands of absorbing or reflecting dyes.

Alternatively, the entire length of a thread may be coated with a single dye. Another thread may also be coated with a second dye. Likewise, for a third and additional threads. When these threads are all woven into the fabric, the reflectance or absorbance infrared wavelengths will have a unique pattern which can also serve as an infrared identifier.

Infrared energy is used for identification because it is not visible to the human eye. Therefore, the person wearing the apparel is unaware an identifier is being read. Furthermore, use of infrared reflecting or absorbing dyes will not change the visible color of the apparel item.

Portable infrared reader 12 has a sufficient combination of infrared emitting components 404 and sensing devices 403 to read the identifier by selectively emitting infrared energy and sensing the infrared energy reflected or absorbed by bands 412, 414, and 416 of infrared dyes on thread 410, when the infrared energy 407 from reader 12 is aimed in the direction of apparel item 16. In some embodiments, more than one identical thread 410 may be woven into the fabric to increase the overall reflectance or absorbance, thereby increasing the overall system sensitivity, and increasing the operating distance over which the system may be used.

Portable infrared reader 12 may include a display screen 401 for presenting images to a potential customer. Specifications, pricing, and retail distribution areas, such as nearest retail store may also be presented to the potential customer on display screen 401. Portable infrared reader 12 may also include a mechanical keyboard 402, or touch sensitive on-screen keyboard (not shown).

In some embodiments, a processor, as described in connection with FIG. 3, may be included in handheld device 12 for implementing various functions described above, including the steps of FIG. 2.

The foregoing description of various embodiments of the present invention has been presented for purposes of illustration and description. It is not intended to be exhaustive or to limit the invention to the precise form disclosed. Many modifications and variations are possible. Such modifications and variations that may be apparent to a person skilled in the art of the invention are intended to be included within the scope of the invention as defined by the appended claims.

What is claimed is:

1. A marketing method, comprising the steps of:
reading, by a portable handheld device, an infrared coded thread that is woven into a fabric that comprises the majority of an article of manufacture, the infrared coded thread including a plurality of banded regions that respectively include infrared dyes that reflect or absorb a specific selection of infrared light wavelengths such that a stock keeping unit (SKU) for that article of manufacture can be determined using the wavelengths of reflected infrared light that result from the reading;
determining, by the portable handheld device and using a first database, a stock keeping unit (SKU) based on the wavelengths of reflected infrared light that resulted from the reading;
retrieving, based on the determined SKU, images, specifications, pricing, and retail distribution areas for the article of manufacture from a second database; and
displaying, based on the determined SKU, said retrieved images, or said retrieved specifications, or said retrieved pricing, or said retrieved retail distribution areas.

2. The method of claim 1, further comprising:
the portable handheld device sending an infrared beam toward said article of clothing and reading the returned infrared image to determine the specific selection of infrared light wavelengths that are reflected or absorbed.

3. The method of claim 2, wherein the portable handheld device is in wireless communication with the first database and second database.

4. The method of claim 1, wherein said images, specifications, pricing, and retail distribution areas are presented to a potential customer on a personal digital assistant or smartphone.

5. A system for marketing an article of manufacture, comprising:
a portable infrared reader that is programmed to, read an infrared coded thread that is woven into a fabric that comprises the majority of an article of manufacture, the infrared coded thread including a plurality of banded regions of infrared dye that reflect or absorb a specific selection of infrared light wavelengths such that a stock keeping unit (SKU) for that article of manufacture can be determined using the wavelengths of reflected infrared light that result from the reading;
a first database residing on a remote server in communication with the portable infrared reader, having a plurality of SKUs and specific selections of infrared light wavelengths that identify those SKUs respectively;
a second database having images, pricing, specifications, and retail distribution areas for an article of manufacture associated with an identified SKU included in the plurality of SKUs; and
a portable handheld device for accessing the first database to match a specific selection of infrared light wavelengths to a specific SKU, the matched SKU being subsequently used by the portable handheld device to access the second database to retrieve images, pricing, specifications, and retail distribution areas for the article of manufacture, and for displaying the retrieved images, or specifications, or pricing, or retail distribution areas.

6. The system of claim 5, wherein the portable infrared reader is an internet enabled device that sends an infrared beam to the article of manufacture that includes the infrared coded thread and subsequently receives the specific selection of infrared light wavelengths.

7. The system of claim 5, wherein said first and second databases are stored in a cloud storage system.

8. The system of claim 5, wherein said portable infrared reader includes the portable handheld device.

9. The system of claim 5, wherein said retail distribution areas include a retail store nearest to the portable handheld device, which has in stock, the article of manufacture identified by the matched SKU.

10. A computer program product for marketing an article of manufacture, said computer program product comprising program instructions stored on a computer readable storage medium; said program instructions comprising:
    program instructions to read, by a portable handheld device, an infrared coded thread that is woven into a fabric that comprises the majority of an article of manufacture, the infrared coded thread including a plurality of banded regions of infrared dye that reflect or absorb a specific selection of infrared light wavelengths such that a stock keeping unit (SKU) for that article of manufacture can be determined using the wavelengths of reflected infrared light that result from the reading;
    program instructions to determine, by the handheld device and using a first database, a stock keeping unit (SKU) based on the wavelengths of reflected infrared light that resulted;
    program instructions to retrieve, based on the determined SKU, images, specifications, pricing, and retail distribution areas for the article of manufacture from a second database; and
    program instructions to display, by the portable device, based on the determined SKU, the retrieved images, or the retrieved specifications, or the retrieved pricing, or the retail distribution areas.

11. The computer program product of claim 10, wherein the portable infrared reader is an internet enabled device that sends an infrared beam to the infrared coded thread that is woven into the fabric of the article of manufacture and subsequently receives the specific selection of infrared light wavelengths.

12. The system of claim 10, wherein said first and second databases are stored in a cloud storage system.

13. The system of claim 10, wherein said portable infrared reader includes the portable handheld device.

14. The system of claim 10, wherein said retail distribution areas includes a retail store nearest to said portable handheld device, which has in stock, the article of manufacture identified by the matched SKU.

15. The system of claim 10, the program instructions further comprising:
    program instructions to retrieve the images, specifications, pricing, and retail distribution areas from the second database using a wireless communication system.

16. The system of claim 10, wherein the program instructions are included as part of a portable RFID reader device.

\* \* \* \* \*